May 24, 1938. E. WILSON Re. 20,741

SAFETY RAZOR

Original Filed March 11, 1933

Inventor
Emmett Wilson

By Lyon & Lyon
Attorneys

Reissued May 24, 1938

Re. 20,741

UNITED STATES PATENT OFFICE 20,741

SAFETY RAZOR

Emmett Wilson, Los Angeles, Calif.

Original No. 2,021,344, dated November 19, 1935, Serial No. 660,334, March 11, 1933. Application for reissue November 9, 1937, Serial No. 173,725

16 Claims. (Cl. 30—44)

My invention relates to safety razors and has particular reference to safety razors of the type employing a blade which is reciprocated to produce a cutting motion of the blade upon the beard.

One of the objects of my invention is to provide a safety razor having a novel and simple means for vibrating the razor or vibrating the blade therein in the direction of its cutting edge thereby facilitating a shaving, reducing the force or pull upon the skin and hair or whiskers and increasing the life of the cutting edge of the blade.

Another object of the invention is to provide a safety razor in which the blade is vibrated or reciprocated by means set in motion manually which means is accessible at all times and which does not interfere with the normal use of the razor.

Another object of the invention is to provide a means of this class whereby extreme high rates of vibration or reciprocation of the blade may be obtained.

Another object of the invention is to provide a means of this class whereby the relatively high rate of vibration or reciprocation of the blade may be maintained over a continued period of time required for one shave.

Another object of the invention is to provide a razor of this class from which the blade may be removed and another substituted as quickly and easily as in the safety razors now in use.

Another object of the invention is to provide a razor of this class in which the several operating parts are so arranged as not to interfere with the ready gripping of the razor and the manipulation thereof during the shaving operation.

Another object of the invention is to provide a razor of this class which is economical of construction, durable, and which will not readily deteriorate or get out of order.

Another object is the provision of a razor having a blade reciprocably mounted upon the head and arranged to be reciprocated by means of a rotatable stem passing through the handle of the razor, a portion of which is cut away to expose the shaft or stem so that it may be engaged by a suitable device for imparting rotary movement thereto.

Another object of the invention is to provide a safety razor of the type described in the preceding paragraphs, in which the number of parts employed in constructing the razor is reduced to the minimum, there being required only a handle, a blade, a guard and a shaft to produce the razor in accordance with my invention.

Other objects and advantages will be apparent from a study of the following specifications, read in connection with the accompanying drawing, wherein Figure 1 is a rear, elevational view of a razor constructed in accordance with my invention;

Figure 1:
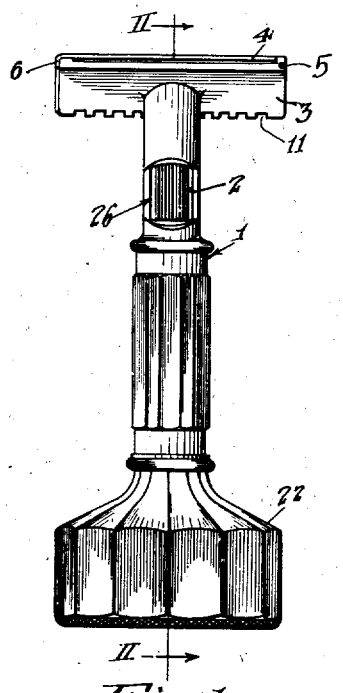

Referring to the drawing, I have illustrated my razor as comprising a handle 1 which is preferably of tubular construction, having a central bore 2 extending longitudinally thereof, the handle being formed with a guard-plate 3 upon the upper end thereof, which may be formed integrally with the handle 1 or may be formed as a separate piece and attached thereto as desired.

A suitable guard 4 is preferably pivoted, as indicated at 5, at one side of the guard-plate 3, the opposite end 6 of the guard being arranged to engage and be detachably secured to the opposite end of the guard-plate 3.

Figure 2:
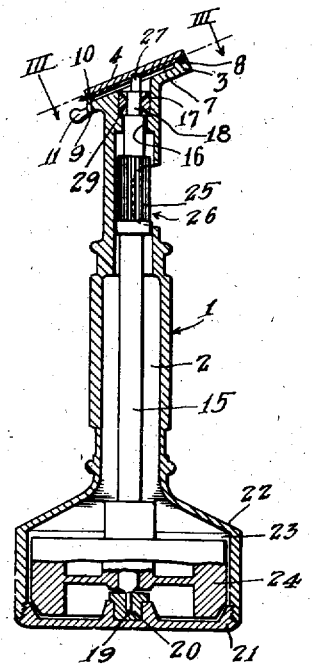
Figure 2 is a vertical, sectional view taken along line II—II of Fig. 1.

By referring particularly to Figure 2, it will be observed that the guard-plate 3 is provided with a recess 7 extending longitudinally of the plate to form the upper surface of the guard-plate with a pair of bearing surfaces 8 and 9 near the upper and lower edges of the plate, the bearing surfaces constituting a bearing support for a blade 10 permitting the blade to be reciprocated longitudinally of the plate 3; that is, along the line at right angles to the axis of the handle 1. The lower side edge of the guard-plate 3 is preferably provided with a series of recesses formed therein, as indicated at 11, to constitute a serrated guard.

Figure 3:
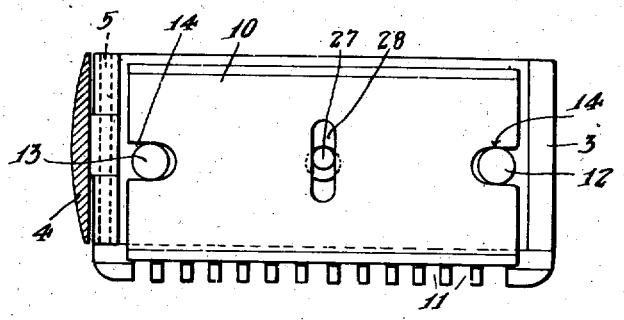
Figure 3 is a detail, sectional view taken along line III—III of Fig. 2.

By referring particularly to Figure 3, it will be observed that the guard-plate 3 is provided with a pair of upstanding posts 12 and 13 near the ends of the plate to engage suitable elongated slots 14 formed in opposite ends of the blade 10, which slots constitute a guide for the blade and assist in supporting the blade and holding the same in place while it is reciprocated.

The hollow handle is illustrated as constituting the housing for a spindle or shaft 15 extending through the longitudinal bore 2, the upper end of the bore being reduced as at 16 to receive a bushing bearing 17 therein constituting the bearing for the upper end 18 of the spindle or shaft 15. The lower end of the spindle or shaft 15 is illustrated as being formed with a pin bearing 19 engageable in a suitable pin bearing seat 20 formed upon or secured to a closure plate 21 constituting the closure plate for the lower end of the handle 1.

It will be observed that the lower end of the handle 1 is flared outwardly, as indicated at 22, to form a chamber 23 surrounding a flywheel 24 rigidly secured to the spindle 15. The flywheel is preferably formed of any suitable material having suitable mass and is preferably formed with the greater portion of the mass thereof arranged near the periphery of the flywheel so that the moment of inertia of the flywheel is relatively great as compared to the actual mass of the total flywheel.

Intermediate the upper and lower ends of the shaft 15, I provide a knurled surface 25 thereon, the knurled surface being preferably of larger diameter than the diameter of the shaft, although this is not essential, the important feature being that the knurled surface should be of sufficient dimensions to be readily engaged by any friction device so that rotary motion may be imparted to the shaft, 15.

It will be observed from an inspection of Figures 1 and 2 that the handle 1, adjacent the knurled portion of the shaft 15 is cut away, as indicated at 26, to form a recess through which the knurled surface is exposed and the recess 26 is preferably of such extent as to expose a considerable area of the knurled surface 25 to engagement by an instrument which may be inserted through the recess. For example, I prefer that the arrangement be such that a cord, rope, strip of rubber, or other suitable friction material, may be held taut in the manner of the usual razor strop and that the exposed knurled section of the shaft may be placed into engagement with said taut cord or strop so that drawing the razor over the cord or strop with the shaft at substantially right angles to the direction of movement of the razor over the strop, will cause the shaft to be rotated.

By rapidly drawing the razor over such strop or cord a number of times with the strop engaging the knurled portion of the shaft through the recess 26, a rapid rotary movement may be imparted to the shaft, which movement, I have found in practice, to be sufficient to cause the inertia of the flywheel to keep the shaft rotating for a relatively long period of time, from 5 to 10 minutes.

The upper end of the shaft 15 is provided with any suitable means for connecting the same with the razor blade 10 so that rotary motion of the shaft 15 will impart a reciprocating motion to the blade. I prefer that this connection be made merely by forming an eccentric end 27 upon the upper end of the shaft 15 so that the eccentric 27 engages an elongated slot 28 near the center of the blade. Thus rotation of the shaft about its axis will cause the eccentric 27 to move the blade to the right and to the left, as viewed in Figure 3. Thus the rotary motion of the blade, which continues as hereinbefore stated for a period of from 5 to 10 minutes, will impart a reciprocating motion of like duration to the blade and it is found in practice that such motion, enduring for this length of time, usually is sufficient for one complete shave, though in the event that the duration of the movement is not sufficient, additional movement may be imparted to the blade merely by drawing the razor again over the cord or strop employed to rotate the shaft.

It will be observed that the pin bearing 19, at the lower end of the shaft, constitutes a bearing of relatively low friction, while the upper end of the shaft is supported in the bearing bushing 17 which may be, and preferably is, provided with beveled upper and lower surfaces, as indicated at 29, so that a relatively small area of contact is provided between this bushing and the bearing portion of the shaft. Thus relatively slight friction occurs between the upper end of the shaft and its bearing.

While I have shown and described the preferred embodiment of my invention, it is to be understood that I do not wish to be limited to any of the details of construction shown herein, except as defined in the appended claims.

I claim:

1. In a razor construction, a handle having a tubular bore extending longitudinally therethrough, a head formed upon one end of said handle, a blade reciprocably mounted upon said head for movement in a direction at right angles to the axis of said bore, means for reciprocating said blade including a shaft extending through said bore and connected to said blade, a recess in said handle extending partially around said bore and communicating with said bore to expose a portion of said shaft, friction means on said shaft at said exposed portion for engagement by a friction device to apply rotary movement to said shaft, and a flywheel on said shaft.

2. In a safety razor, a handle having a bore extending longitudinally thereof, a recess through the side of said handle communicating with the interior bore thereof, a head formed upon one end of said handle, a blade reciprocably mounted upon said head for movement in a direction at right angles to the axis of said bore, a shaft extending coaxially through said bore, means coupling said shaft to said blade for reciprocating said blade by rotation of said shaft, friction means on said shaft aligned with said recess whereby said friction means may be engaged by a friction device exteriorly of said handle to impart rotary movement to said shaft and a flywheel on said shaft.

3. In a safety razor, a handle having a bore extending longitudinally thereof, a recess through the side of said handle communicating with the interior bore thereof, a head formed upon one end of said handle, a blade reciprocably mounted upon said head for movement in a direction at right angles to the axis of said bore, a shaft extending coaxially through said bore, means coupling said shaft to said blade for reciprocating said blade by rotation of said shaft, a portion of said shaft being exposed through said recess for engagement with a friction strop to impart rotary movement to said shaft, means on said shaft at said exposed portion for frictionally engaging said friction means and a flywheel on said shaft.

4. In a safety razor, a handle member having a tubular bore extending longitudinally therethrough, a razor blade supporting head formed upon one end of said handle member, a blade reciprocally mounted upon said head for movement in a direction at right angles to the axis of said bore, means for reciprocating said blade including a shaft extending through said bore and connected to said blade, a recess in said handle member extending partially around said bore and communicating with said bore to expose a portion of said shaft for engagement by a friction device to apply rotary motion to said shaft, an enlargement of said handle member at the end thereof opposite said head, and a fly wheel on said shaft housed within said enlargement of said handle member.

5. In a safety razor, a head, a blade reciprocally mounted upon said head, a hollow handle member extending from said head, a shaft having fly wheel thereon rotatably mounted within said hollow handle member and extending through said head in engagement with said blade, means coupling said blade to said shaft for reciprocating said blade by rotation of said shaft, a recess in said hollow handle member extending partially around said shaft to expose a portion of said shaft for engagement by a friction device for imparting rotary movement to said shaft.

6. In a safety razor, a frame comprising, a head and a hollow handle member extending from one side of the head, a blade reciprocally mounted on said head, a shaft rotatably mounted in the handle member, means eccentrically connecting said shaft with the blade for reciprocating the latter with the rotation of the shaft, a fly wheel mounted on the shaft, said shaft having a portion exposed through said handle member for engagement by a friction device for imparting rotary movement to said shaft.

7. In a safety razor, a frame comprising, a hollow handle having a head positioned transversely at one end thereof and provided at its opposite end with an enlarged casing portion, a shaft rotatably mounted within the hollow handle, a blade reciprocally mounted on the head, eccentric means connecting the shaft with the blade, a fly wheel mounted on the shaft and positioned within the casing portion, there being provided at the outer side of the fly wheel and coaxial with the shaft a bearing portion, and a cap secured to the outer side of the casing portion and provided with means cooperating with the bearing portion for centering the extended end of the shaft.

8. In a safety razor, a head, a blade reciprocally mounted on said head, a hollow handle member extending from said head, a shaft having a fly wheel thereon and the whole rotatably mounted within said hollow handle, means coupling said blade to said shaft for reciprocating said blade by rotation of said shaft, and means in connection with said shaft to facilitate the manual rotation of said shaft.

9. In a safety razor, a head, a blade reciprocally mounted on said head, a handle extending from said head and having a longitudinal bore extending therethrough communicating with said head, a shaft rotatably mounted in said bore and extending into said head, means on the end of said shaft projecting into said head for eccentrically engaging said blade to impart reciprocal motion to said blade upon rotation of said shaft, a fly wheel on said shaft at a point remote from said blade engaging end thereof and positioned in said handle, and means in connection with said shaft to facilitate the manual rotation of said shaft.

10. In a safety razor, a head, a blade reciprocally mounted on said head, a hollow handle extending from said head, a shaft having a fly wheel thereon and the whole rotatably mounted within said hollow handle, means coupling said blade to said shaft for reciprocating said blade by rotation of said shaft, and means in connection with said shaft for engagement with manual rotating means through an opening in the side of said handle and operable by the application of force in a direction at right angles to the axis of said shaft.

11. In a safety razor, a head, a cutting element reciprocally mounted in said head, a hollow handle member extending from said head, a shaft having a fly wheel thereon and the whole rotatably mounted within said hollow handle, means coupling said cutting element to said shaft for reciprocating said cutting element by rotation of said shaft, and means in connection with said shaft to facilitate the manual rotation of said shaft.

12. In a safety razor, a head, a cutting element reciprocally mounted in said head, a hollow handle member extending from said head, a shaft having a fly wheel thereon rotatably mounted within said hollow handle member and extending through said head in engagement with said cutting element, means coupling said cutting element to said shaft for reciprocating said cutting element by rotation of said shaft, a recess in said hollow handle member extending partially around said shaft to expose a portion of said shaft for engagement by a friction device for imparting rotary movement to said shaft.

13. In a safety razor, a head, a cutting element reciprocally mounted in said head, a hollow handle member extending from said head, a shaft having a fly wheel thereon rotatably mounted within said hollow handle member and extending through said head in engagement with said cutting element, means coupling said cutting element to said shaft for reciprocating said cutting element by rotation of said shaft, a recess in said hollow handle member extending partially around said shaft to expose a portion of said shaft for engagement by a friction device for imparting rotary movement to said shaft, said cutting element operating in a plane which is at an angle to the axis of the shaft.

14. In a razor construction, a handle having a tubular bore extending longitudinally therethrough, a head formed upon one end of said handle, a cutting element reciprocally mounted in said head for movement in a direction at right angles to the axis of said bore, means for reciprocating said cutting element including a shaft extending through said bore and connected to said cutting element, a recess in said handle extending partially around said bore and communicating with said bore to expose a portion of said shaft, friction means on said shaft at said exposed portion for engagement by a friction device to apply rotary movement to said shaft, and a fly wheel on said shaft.

15. In a safety razor, a head, a cutting element reciprocally mounted in said head, a hollow handle member extending from said head, a shaft having a fly wheel thereon and the whole rotatably mounted within said hollow handle, means coupling said cutting element to said shaft for reciprocating said cutting element by rotation of said shaft, means in connection with said shaft to facilitate the manual rotation of said shaft, said cutting element operating in a plane which is at an angle to the axis of the shaft.

16. In a safety razor, a head, a cutting element reciprocally mounted in said head, a hollow handle member extending from said head provided with a bearing adjacent said head, a shaft having a fly wheel thereon, and the whole rotatably mounted within said hollow handle, means coupling said cutting element to said shaft for reciprocating said cutting element by rotation of said shaft, said shaft having a portion exposed through said handle member adjacent to said bearing for engagement by a friction device for imparting rotary movement to said shaft.

EMMETT WILSON.